United States Patent [19]
Henegar

[11] 3,854,660
[45] Dec. 17, 1974

[54] CONTROL SYSTEM FOR MULTIPLE TAPE READERS IN AN N/C SYSTEM

[75] Inventor: Hubert B. Henegar, Detroit, Mich.

[73] Assignee: The Bendix Corporation, Southfield, Mich.

[22] Filed: Sept. 21, 1973

[21] Appl. No.: 399,600

Related U.S. Application Data

[63] Continuation of Ser. No. 249,445, April 26, 1972, abandoned.

[52] U.S. Cl. ......... 235/61.11 R, 235/151.11, 360/91
[51] Int. Cl. . G06k 13/00, G06f 15/46, G11b 15/00
[58] Field of Search ............ 235/61.11, 61.6 R, 150, 235/151.11; 340/147 P, 172.5, 174.1 K; 178/3, 4, 17 A, 17 B, 42, 112; 360/71, 91

[56] References Cited

UNITED STATES PATENTS

| | | | |
|---|---|---|---|
| 2,116,549 | 5/1938 | Zenner | 178/3 |
| 2,477,832 | 8/1949 | Schuler | 178/17 A |
| 3,025,341 | 3/1962 | Wright et al. | 178/3 |
| 3,179,742 | 4/1965 | Meyers | 178/3 |
| 3,265,946 | 8/1966 | Johnson et al. | 340/174.1 K |
| 3,559,188 | 1/1971 | Proctor | 235/151.11 |
| 3,654,616 | 4/1972 | Dunne et al. | 235/151.11 |

OTHER PUBLICATIONS

Reference Manual, IBM 1401, Data-System, 1960, pp. 55–62.

*Primary Examiner*—D. W. Cook
*Attorney, Agent, or Firm*—Lester L. Hallacher

[57] ABSTRACT

The invention is directed to a system for controlling multiple tape readers in a Numerical Control System. When use of the tape on one tape reader is completed, another tape reader is actuated and placed into service. During the use of the second tape reader, the exhausted tape is rewound onto the first tape reel by the first tape reader. Also, while one tape reader is enabled, all others are disabled to prevent conflict between the various tape readers. The system, therefore, includes one control channel per tape reader and serves to prevent the simultaneous enabling of more than one tape reader. Thus, a tape the use of which is no longer required, can be rewound and replaced while another tape is in use to thereby greatly increase the operating time of the N/C system.

10 Claims, 2 Drawing Figures

CONTROL SYSTEM FOR MULTIPLE TAPE READERS IN AN N/C SYSTEM

CONTINUATION

This is a continuation of U.S. Application Ser. No. 249,445 filed Apr. 26, 1972 now abandoned.

CROSS REFERENCE TO RELATED APPLICATIONS

The invention described herein is an improvement of the system described in Application Ser. No. 62,244 now U.S. Pat. No. 3,746,845 filed Aug. 6, 1970 by Hubert B. Henegar and Robert J. Patterson and said patent is useful in understanding the environment in which the invention is employed.

The invention described herein can be employed in a system including the invention described in Application Ser. No. 249,448, now U.S. Pat. No. 3,761,915 entitled "Output Command Decoder for Numerical Control Equipment" filed of even date herewith by Hubert B. Henegar and Robert J. Patterson and assigned to the assignee of the instant application.

The invention described herein can also be employed in a system including the invention described in Application Ser. No. 249,447, entitled "Numerical Control System Control Program Loader" filed of even date herewith by Hubert B. Henegar and assigned to the assignee of the instant application.

The invention described herein can also be employed in a system including the invention described in Application Ser. No. 249,446, now U.S. Pat. No. 3,755,787 entitled "System for Providing Interrupts in a Numerical Control System" filed of even date herewith by Hubert B. Henegar and assigned to the assignee of the instant application.

BACKGROUND OF THE INVENTION

In numerical control equipment, a tape is perforated with coded holes which represent the command information used to control the motion of an element such as a cutting tool, pen, or electron beam. The coded information is injected into a computer and the computer then processes the information to actuate the numerical control system which in turn utilizes the pulse information to generate the control signals to energize servo motors, pulse motors, or the deflection coils of a CRT.

The injection of the data into the computer from the tape is effected by use of a tape reader. The tape is wound onto a reel and then pulled past the tape reader which translates the perforations within the tape into electrical pulses which are injected into the computer.

In prior art systems, the tape reader is capable of utilizing a single tape and thus after a particular tape is exhausted, it must be rewound before it is removed from the tape reader and then replaced by the next tape to be read. This is disadvantageous because the computer and thus the numerical control system cannot be in operation during the rewinding and removal of the tape.

SUMMARY OF THE INVENTION

The inventive system overcomes these deficiencies because it provides a system for utilizing multiple tape readers for one piece of numerical control equipment. After one tape is exhausted and needs to be rewound, the inventive system effects the rewinding while a second tape is simultaneously being read into the computer. When the first tape is completely rewound, the system stops the first reel so that it can be replaced with a third tape. After the second tape is exhausted, it may be rewound while the third tape is used to inject data into the computer. This automatic and alternate enabling of multiple tape readers permits virtually continous operation of the N/C system and thus greatly increases the operating time of the N/C system because there is no shut-down time for the rewinding and replacing of tapes.

For descriptive purposes only, assume that the inventive system includes two identical tape reader control systems. At any given instant, only one control system/-tape reader is enabled and the other is disabled.

When enabled a tape reader can respond to commands from the computer and can input data to the computer from the tape. When disabled a tape reader can respond to only an enable command from the computer and cannot input data to the computer. While one tape is being read into the computer, the control system of the other tape reader has been disabled by a command from the computer. At the end of the reading of the first tape into the computer, a rewind command is output to the first control system and then a disable command is output to the first control system. Then an enable command is output to the second tape reader control. The second control system then inputs tape data upon command from the computer while the first tape reader control effects the rewinding of the first tape. Because one tape reader is disabled while the other is enabled, conflicts between the two tapes is avoided. Also, because one tape can be rewound while the other is being read, the operation time of the numerical control equipment is substantially increased because shut downs which ordinarily would occur during rewinding of the tape are avoided.

DETAILED DESCRIPTION

Figure 1:
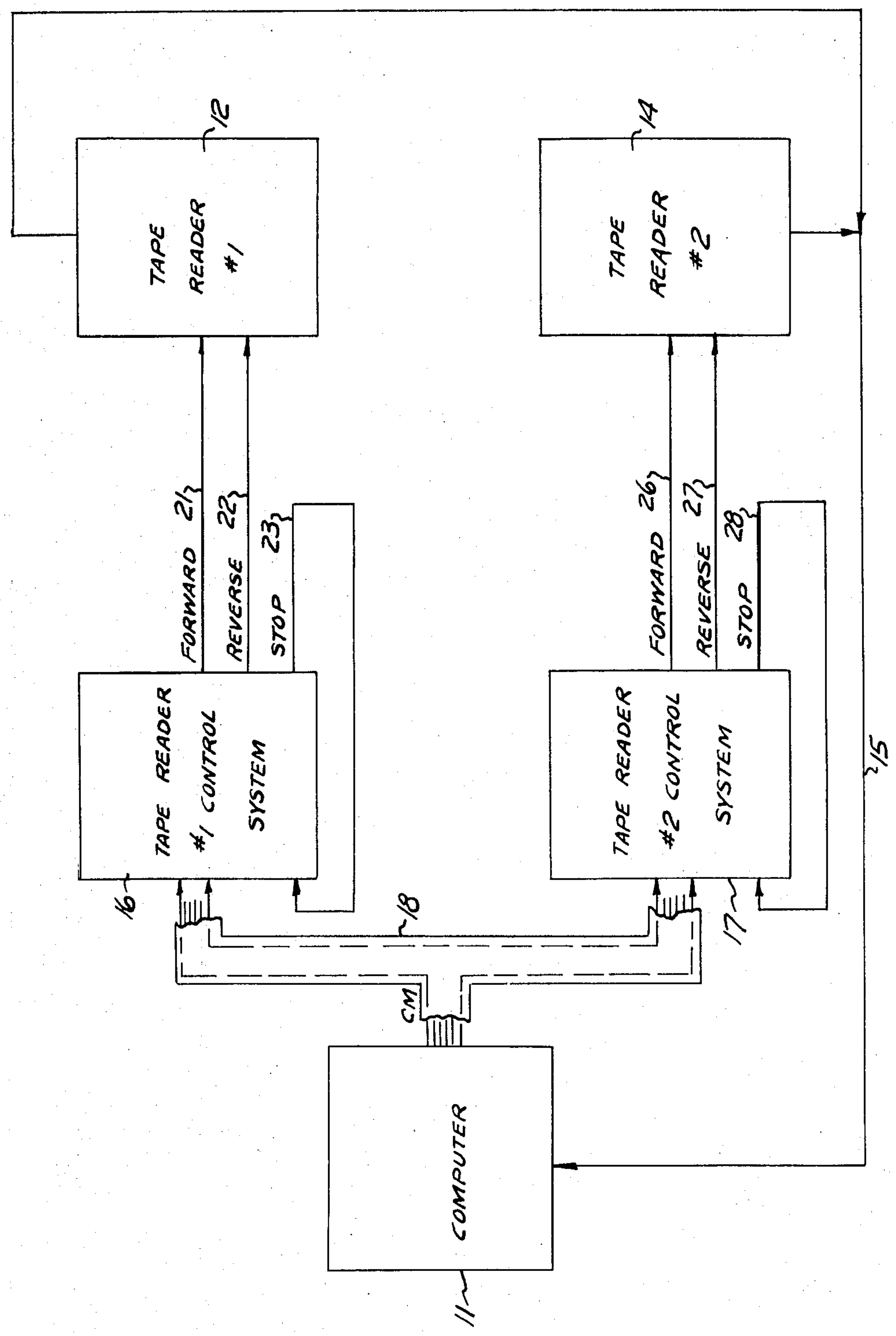
FIG. 1 is a simplified block diagram showing two interconnected tape reader control systems of the inventive type.

As shown in FIG. 1, Computer 11 is connected to receive numerical coded pulse data from either Tape Reader 12 or Tape Reader 14 over Line 15. Computer 11 is used to control two Tape Reader Control Systems 16 and 17 by use of command (CM) signals supplied over Cable 18. The command signals (CM) are the output signals of the decoders shown in U.S. Pat. No. 3,761,915 fully identified hereinabove.

These command signals appear as a particular combination of Logic ONE's and ZERO's so that either Control System 16 or 17 is enabled. The commands for Control Systems 16 and 17, as well as the other signals required for the inventive plural tape reader systems, are previously injected into Computer 11 by the use of a special loader program. The special loader program is injected into the computer with the use of a bootstrap loader much in the same manner as those utilized in prior art systems. Thus, the special loader program is first fed to Computer 11 and then used to control Tape Readers 12 and 14 and perform all other other functions required for loading the full control program into Computer 11. This type of loading is fully described in Application Ser. No. 249,447 fully identified hereinabove.

Computer 11 supplies information to Tape Reader Control Systems 16 and 17 over Cable 18 and both tape reader control systems can perform the same functions. Thus, Tape Reader Control Systems 16 and 17 are identical but may be somewhat differently wired to Computer 11 because they may have different commands for enabling and disabling the tape reader and controls. Each tape reader and control may have unique enable and disable commands or, in the case of a dual tape reader system, the enable command for one tape reader may also be used as the disable command for the other tape reader and vice-versa.

As shown in FIG. 1, Tape Reader No. 1 Control System 16 has a plurality of Output Leads 21 through 23 which carry the various signals generated by Tape Reader Control System 16 to Tape Reader 12. In similar manner, Tape Reader Control 17 has a similar set of Output Leads 26 through 28 which supply control signals to Tape Reader 14. When enabled, Control System 16 accepts and responds to commands from the computer such as forward, reverse, stop, etc. When Control System 16 is enabled, Control System 17 is disabled and hence will prevent Tape Reader 14 from acting upon any control signals while Tape Reader 12 is enabled and thereby prevents Tape Reader 14 from interfering with the operation of Tape Reader 12. The Forward signal supplied over Line 21 is used to cause the reel carrying the coded tape to move in the forward direction so that the coded information on the tape is injected into Computer 11 through Tape Reader 12. The Reverse signal supplied over Line 22 is used to reverse the rotation of the tape reel so that the tape is rewound and put into condition for reuse at a subsequent time. The Stop signal supplied over Line 23 is used to stop rotation of the tape reel in either direction.

Tape Reader Control System 17 supplies similar signals to Tape Reader 14 over Lines 26 through 28.

When either Tape Reader 12 or 14 is disabled, no data can be injected into Computer 11 by the disabled tape reader. However, the disabled tape reader can complete a rewind command if one is received prior to the disabling command. The control system can sense the rewind stop character and if rewinding will cause the tape reader to stop when the character is read by the tape reader. Note that the sensing of the rewind stop character and the stopping of the tape reader is done without any action by the computer after the rewind command has been output.

Figure 2:
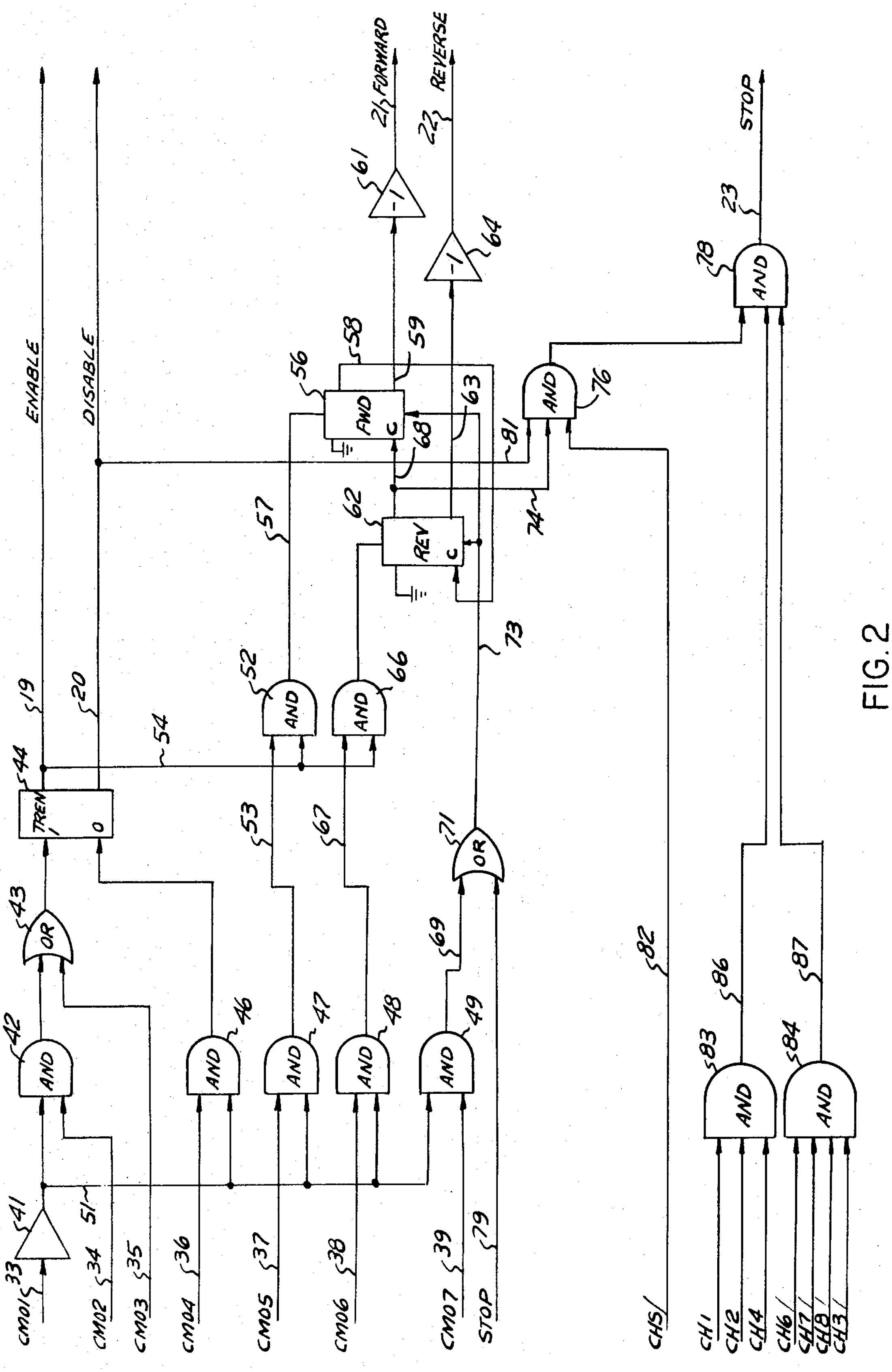
FIG. 2 is a preferred embodiment of one of the inventive tape reader control systems.

The generation of the various signals shown in FIG. 1 is fully described with respect to FIG. 2 which is a preferred embodiment of Tape Reader Control Systems 16 and 17. FIG. 2 shows only one of the tape reader control systems and it should be understood that two such systems will be incorporated into a numerical control system employing the inventive concepts.

As shown in FIG. 2, the command signals (CM) identified as CM01 through CM07 are received by the tape reader control system over Input Leads 33 through 39, respectively. The CM01 signal is received on Input Line 33 and is applied to AND Gate 42 through Amplifier 41. AND Gate 42 also receives a CM02 signal on Input Lead 34 and thus both the CM01 and CM02 command signals must be present for AND Gate 42 to generate a Logic One output. Accordingly, the CM01 and CM02 signals form the address of the particular tape reader control system being put into operation and their simultaneous application to AND Gate 42 results in the generation of an enable signal on Output Lead 19 in a manner described hereafter. Amplifier 41 merely amplifies the CM01 signal before applying it to the various AND Gates. This is the same function performed by the other amplifiers shown in FIG. 2. Obviously, amplifiers may or may not be used as desired throughout the system and no additional discussion is presented herein relative to the use of amplifiers.

It should be understood that the CM01 and CM02 command signals applied to Input Leads 33 and 34 are derived from the decade decoder which is fully described in U.S. Pat. No. 3,761,915.

The output of AND Gate 42 is applied to an OR Gate 43 so that OR Gate 43 yields a Logic ONE output in response to the simultaneous application of the CM01 and CM02 command pulses to AND Gate 42. The output of OR Gate 43 actuates the ONE input of a Tape Reader Enable Flip-Flop 44. Flip-Flop 44 is then enabled by and generates a Logic ONE output level which is applied to Output Lead 19. This signal serves as the Enable signal to Tape Reader 12 of FIG. 1 and thus enables the tape reader so that other control signals such as Forward, Reverse, etc., can be received.

A CM03 command signal is received by Input Lead 35 and applied to OR Gate 43 so that the CM03 command signal also can cause Flip-Flop 44 to generate an Enable signal on Output Lead 19. Hence, the tape reader can be enabled in the absence of an address formed by the CM01 and CM02 commands. The CM03 command signal is utilized when a signal tape reader is used in the system so that the tape reader can be enabled without the address formed by the CM01 and CM02 command signals. This saves programming and memory spaces when a single tape reader is used. When used in single tape reader system, the CM03 signal can be supplied by applying the On voltage from the system power supply directly to Input Lead 35 when the system On switch is actuated. Therefore, the enable signal need not be programmed into Computer 11 when a single tape reader is used.

When dual tape readers are utilized so that the CM01 and CM02 address signals enable the tape reader, Input Lead 35 preferably is grounded to prevent erroneous enable signals from being generated by OR Gate 43 as the result of extraneous voltages which may be present on Input Lead 35.

The CM01 command signal is also applied to a series of AND Gates 46 to 49 through Amplifier 41 over Lead 51. The Logic ONE condition of the CM01 command signal is therefore required for the generation of all the other output signals of the tape reader control system. Hence, until the CM01 command signal has been applied, the tape reader control system cannot generate the control signals which are required to control a tape reader and NO ENABLE signal has been presented to the tape reader.

A CM04 command signal is applied by way of Lead 36 to AND Gate 46. Accordingly, when a CM01 signal and the CM04 signal are simultaneously present, AND Gate 46 generates a Logic ONE output pulse. This pulse is applied to the ZERO input of Flip-Flop 44 and a Logic ONE output is available on Output Lead 20 of Flip-Flop 44. This logic pulse serves as the Disable signal shown on Line 20.

It should now be understood that the inventive system is enabled by the simultaneous application of CM01 and CM02 signals to AND Gate 42. When the system is to be disabled, the CM04 signal is applied to Lead 36 and AND Gate 46 yields a Logic ONE output. The ZERO input of Flip-Flop 44 is then actuated and the output signal on Output Lead 20 is a Logic ONE. This signal serves as the Disable signal for the tape reader. The signal on Line 19 is Logic ZERO.

In some instances it may be desirable to reverse the CM02 and CM04 inputs on the second tape reader. Thus, a command which causes CM01 and CM02 inputs to be Logic ONE will simultaneously enable tape reader No. 1 and disable tape reader No. 2. Similarly, a command which causes CM01 and CM04 to be Logic ONE will disable tape reader No. 1 and enable tape reader No. 2. Alternative operations are available. In another variation, four distinct commands could be used for enabling and disabling the two tape readers. When more than two tape readers are employed, this method becomes a necessity.

A Forward command is provided to the tape reader when CM05 command signal is applied to AND Gate 47 over Input Lead 37. AND Gate 47 also receives the CM01 command signal and accordingly generates a Logic ONE output when the CM01 and CM05 command signals are simultaneously present. This signal is applied to AND Gate 52 over Lead 53. AND Gate 52 also receives the Enable output of Flip-Flop 44 which is present on an Output Lead 19 over Lead 54. The output of AND Gate 52 is applied to the preset input of a Forward Flip-Flop 56 over Lead 57. With the application of a Logic ONE to the preset input, Flip-Flop 56 provides a Logic ONE signal to Output Lead 58 and a Logic ZERO signal to Output Lead 59. The Logic ZERO on Output Lead 59 is inverted in Inverter 61 so that a Logic ONE signal is available on Lead 21. This signal serves as the Forward control signal to cause the tape reader to run in the forward direction required for injecting data into Computer 11. Lead 21 is identically identified in FIGS. 1 and 2 to show their correspondence.

The Logic ONE output available on Output Lead 58 of Forward Flip-Flop 56 is applied to the clock Input of Reverse Flip-Flop 62 and, since the Flip-Flop triggers on the positive-going edge of the clock pulse and the Logic input to the Flip-Flop is wired to ground (Logic 0), this will result in the presence of a Logic One on Output Lead 63. This Logic ONE is inverted into a ZERO Logic output by Inverter 64 so that a Logic ZERO Reverse signal is present on Output Lead 22. The tape reader under control now receives a Logic ONE Forward signal over Input Lead 21 and a Logic ZERO Reverse signal over Input Lead 22 and therefore runs in the Forward direction. It therefore is now evident that the CM05 command signal applied to Input Lead 37 is utilized to cause the tape reader to run in the Forward direction when CM01 has been applied to Lead 33.

A Reverse command is supplied to the tape reader when a CM06 command signal is applied to one input terminal of AND Gate 48 over Input Lead 38. AND Gate 40 also receives the CM01 signal and accordingly AND Gate 48 provides a Logic ONE output when the CM01 and CM06 signals are simultaneously present. The Logic ONE output of AND Gate 48 is applied to an AND Gate 66 over Lead 67. AND Gate 66 also receives the Enable output of TREN Flip-Flop 44 over Lead 54 and provides a Logic ONE pulse to the preset input of Reverse Flip-Flop 62. In this condition, Reverse Flip-Flop 62 provides a Logic ONE level to Output Lead 68 and this signal is applied to the clock input of Forward Flip-Flop 56 resulting in the application of a Logic ONE pulse to Output Lead 59 of Forward Flip-Flop 56 in a manner described previously with regard to Flip-Flop 62. The Logic ONE on Lead 59 is inverted into a ZERO by Inverter 61 so that a Logic ZERO signal is present on Lead 21. Accordingly, no Forward signal is supplied to the tape reader and the tape reader will not run in a Forward direction.

When a Logic ONE CM06 signal is applied to Lead 38, a ZERO logic CM05 signal is applied to Input Lead 37 and hence the output signal of AND Gate 52 is a Logic ZERO resulting in a Logic ZERO output signal being available on Output Lead 58 of Forward Flip-Flop 56. This results in a Logic ZERO signal on Output Lead 63 of Reverse Flip-Flop 62. The Logic ZERO signal on Lead 63 is inverted into a Logic ONE signal by Inverter 64 and a Logic ONE Reverse signal is available on Lead 22 to cause the tape reader to run the reel in the reverse direction. The Reverse signal is used to rewind a tape onto a reel after the tape is no longer required. The CM06 signal supplied Input Lead 38 along with the CM01 signal to Lead 31 accordingly serves as the Reverse command used to rewind the tape.

The CM07 command signal supplied to Input Lead 39 is applied to AND Gate 49 which generates a Logic ONE output when a CM01 signal is simultaneously present on Input Lead 33. The Logic ONE output pulse of AND Gate 49 is supplied over Lead 69 to OR Gate 71. The output of OR Gate 71 is amplified in Amplifier 72 and then applied to the reset inputs of Forward Flip-Flop 56 and Reverse Flip-Flop 62 by way of Input Lead 73. Irrespective of the states of Flip-Flops 56 and 62, a signal from OR Gate 71 resets the Flip-Flops so that Logic ZERO signals are available on Output Leads 58 and 68 and Logic ONE pulses are available on Output Leads 59 and 63. The Logic ONE signals on Leads 59 and 63 are respectively inverted in Inverter 61 and 64 so that neither the Forward or Reverse signal is applied to the tape reader. The tape reader therefore is stopped.

The Logic ONE present on Output Lead 68 of Reverse Flip-Flop 62 when the tape reader is rewinding is applied by way of Lead 74 to AND Gate 76. When the tape reader is disabled, the Logic ONE from Flip-Flop 44 on Lead 20 enables AND Gate 76 over Lead 81 which in combination with AND Gate 78 will cause a Logic ONE on Lead 23 when the rewind stop character (channels 1, 2, and 4 punched) is read by the tape reader. Lead 23 is connected to Lead 79 which also serves as an input line to OR Gate 71. Hence, the system is stopped for any condition which enables AND Gate 76 and AND Gate 78.

AND Gate 76 receives the Disable signal present on Output Lead 20 by way of Lead 81 and the Logic ONE signal available on Line 68 of Flip-Flop 62 when the tape reader is running in reverse. AND Gate 76 also receives a CH5/ signal over Line 82. This signal is a Logic ONE when Channel 5 of the tape does not have a perforation. Hence, the absence of such a perforation is a condition of enabling AND Gate 76. Three conditions are thus required to enable AND Gate 76: (1) the tape reader must be disabled, (2) the tape reader must be running in reverse, (3) no perforation can be present in Channel 5 of the tape. When these three conditions exist, AND Gate 76 provides an enabling Logic ONE to AND Gate 78.

The enabling of AND Gate 78 also requires Logic ONE inputs from AND Gates 83, 84. AND Gate 83 receives Channel 1 (CH1), Channel 2 (CH2), and Channel 4 (CH4) inputs, the identification used in the FIG. 2 indicates that these signals are high, or Logic ONES's, when perforations are present in the tape along these channels. When this condition exists, AND Gate 83 is fully enabled and yields a Logic ONE input over Lead 83 to AND Gate 78, thereby enabling AND Gate 78.

AND Gate 84 receives CH6/, CH7/,CH8/, and CH3/ signals and the symbols used in the figure are used to illustrate that Logic ONE's are input to AND Gate 84 when the tape is not perforated along these channels. When all of the CH6/, CH7/, CH8/, and CH3/ signals are logic ONE's, AND Gate 84 supplies a Logic ONE input to AND Gate 78, thereby enabling AND Gate 78.

I claim :

1. In a numerical control system having a data storage medium for receiving data from coded records through a plurality of selectively actuated tape readers, a tape reader control system for selectively controlling said tape readers so that one of said tape readers can be actuated to supply data to said storage medium simultaneously with the rewinding of another of said tape readers and the deactuation of the remaining of said tape readers, said tape reader control system comprising:

first means receiving particular command signals for selectively generating an enable signal and a disable signal in response to said command signals, said enable signal placing a tape reader in condition for receiving other commands and said disable signal prevents a tape reader from receiving other commands;

second means receiving other particular command signals for selectively generating forward and reverse signals in response to said other command signals;

third means receiving tape channel perforation signals for providing actuating signals indicating channel perforation conditions of a tape passing through one of said tape readers; and fourth means for generating a stop signal, said fourth means receiving said disable signal, said reverse signal and the output of said third means as enabling signals so that said stop signal is generated upon the failure of any one of said enabling signals to thereby effect the disabling of said tape reader.

2. The system of claim 1 wherein said particular command signals include a tape reader control system address, and a disable command signal;

and said other particular command signals include forward and reverse command signals.

3. The system of claim 2 wherein said first means includes bistable circuit means for generating said enable signal in response to said control system address and said disable signal in response to said disable command.

4. The system of claim 2 wherein said second means includes bistable circuit means for producing said forward signal in response to said forward command, and said reverse signal in response to said reverse command.

5. The system of claim 3 wherein said second means includes bistable circuit means for producing said forward signal in response to said forward command, and said reverse signal in response to said reverse command.

6. The system of claim 2 wherein said tape reader control system address is composed of at least two address commands;

and wherein second means is responsive to one of said address commands so that said forward and said reverse signals are dependent upon said one address command.

7. A tape reader control system for permitting the use of at least two tape reels so that one of said tape reels can be rewound while another of said tape reels is providing input data to the memory means of a numerical control system, said numerical control system including a plurality of tape readers and one of said tape reader control systems for each of said tape readers; said tape reader control systems each including:

a set of input leads for respectively receiving address commands, a disable command, a forward command, a reverse command, and a stop signal;

bistable circuit means for producing an enable signal in response to said address commands, and a disable signal in response to said disable command;

and logic means receiving said forward command, said reverse command and at least one of said address commands for selectively producing a forward signal in accordance with the simultaneous presence of said one address command and said forward command and a reverse signal in accordance with the simultaneous presence of said one address command and said reverse command.

8. The system of claim 7 further including means for receiving tape channel perforation signals indicating that selected conditions are present on the tape under control and generating enabling signals in response to said tape channel perforation signals; and stop signal generation means responsive to said enabling signals, said reverse signal, and said disable signal for providing a stop signal to the tape reader under control.

9. The system of claim 8 further including second logic means responsive to said stop signal; said logic means for producing forward and reverse signals being responsive to said second logic means so that the generation of said forward and reverse signals ceases upon the reception of said stop signal.

10. The system of claim 7 wherein said tape reader control systems are mutually responsive so that the enable signal from one of said control systems serves as the disable signal for all other of said control systems.

* * * * *